United States Patent [19]

van Egmond et al.

[11] Patent Number: 5,229,583
[45] Date of Patent: Jul. 20, 1993

[54] SURFACE HEATING BLANKET FOR SOIL REMEDIATION

[75] Inventors: Cornelis F. van Egmond, Canyon Lake; Frederick G. Carl, Jr., Houston; George L. Stegemeier, Houston; Harold J. Vinegar, Houston, all of Tex.

[73] Assignee: Shell Oil Company, Houston, Tex.

[21] Appl. No.: 951,954

[22] Filed: Sep. 28, 1992

[51] Int. Cl.$^5$ .......................... H05B 1/00; H05B 3/34
[52] U.S. Cl. ..................................... 219/549; 219/213
[58] Field of Search ................. 219/213, 549, 545; 373/109, 117

[56] References Cited

U.S. PATENT DOCUMENTS 1,883,761  3/1930  Stransky .......................... 219/545
3,515,849  5/1967  Math ................................ 219/213
4,926,026  5/1990  Tarry ............................... 219/213
4,984,594  1/1992  Vinegar et al. ................... 134/21

Primary Examiner—Bruce A. Reynolds
Assistant Examiner—Michael D. Switzer

[57] ABSTRACT

This invention comprises a surface heating blanket assembly useful for soil remediation. The assembly principally comprises a metallic furnace belt with tubular electric heating elements inserted between the rungs thereof and making low resistance contact therewith. The furnace belt heater is capable of being rolled and dragged, and flexibly conforms to the earth's surface for maximum heat transfer to the soil. A layer of permeable insulation and an impermeable sheet may be placed on top of the heater. A vacuum may be pulled under the impermeable layer by means of a hole therethrough connected to a vacuum pump.

12 Claims, 7 Drawing Sheets

□ 1 INCH
○ 2 INCHES
◇ 3 INCHES
△ 4 INCHES

SURFACE HEATING BLANKET FOR SOIL REMEDIATION

FIELD OF THE INVENTION

The invention comprises a rugged, high-temperature heating blanket for in near-surface soil remediation of chemical spills and the like wherein the blanket provides an even temperature distribution.

BACKGROUND OF THE INVENTION

The public is becoming increasingly aware of the dangers of surface soil contamination from a variety of sources, including chlorinated solvents, pesticides, chemical and microbial warfare agents, heavy metals, radioactive wastes, etc. The standard method for remediating such contaminated, near surface soils is excavation followed by incineration. Unfortunately, this is very expensive and requires removal and incineration of a large amount of soil in order to destroy very small concentrations of contaminants.

In Assignee's U.S. Pat. No. 4,984,594, Vinegar and Stegemeier propose a soil remediation method using an electrical surface heating blanket to heat the soil. The electrical heater, positioned on the soil surface, is permeable to vapors which emanate from the soil when heated. A permeable, thermally-insulating mat is located above the electrical heater, and an impermeable sheet is placed on top of the mat. A vacuum is established through a hole in the impermeable sheet through which vaporized contaminants are drawn as the soil is heated by the electrical heater.

In a preferred embodiment of the U.S. Pat. No. 4,984,594, the electrical heater comprises a mesh of electrically conductive metal wires which mesh is electrically energized by passing current through the wires. Instead of a mesh, the wires may also loop back and forth and may be stitched into a ceramic fiber cloth. The heater could also consist of metal strips or ribbons, thin metal foil or sheet, or a metallic coating in a defined pattern. Several of these designs were tried in small scale applications. Although these heater designs were effective in small scale applications, it proved difficult to scale up the system to a rugged, high-temperature field design that could be dragged over rough terrain. Another problem was that local irregularities in the soil, such as stones or holes, would result in local hot spots in the heater mesh. This caused rapid corrosion and resulted in destruction of the electrical heater, particularly when temperatures approached 1000° C. When this happened the entire heater mesh had to be replaced. All the heater designs described in U.S. Pat. No. 4,984,594 consisted of fine mesh or other thin metal heating elements. The elements failed to distribute the heat from localized hot spots and were susceptible to thermal runaway.

In Assignee's copending application Ser. No. 800,192 filed Nov. 27, 1991, a plurality of stranded nichrome wires are placed inside an electrically insulating sleeve of Nextel. The sleeve is surrounded by a stainless steel tube, the assembly comprising a heating element. A plurality of heating elements are connected in a rigid frame to form a heater array having an electrical bus bar for supplying power to each heating element.

It is an object of the present invention to provide a surface heating blanket assembly that has several advantages relative to the designs disclosed in U.S. Pat. No. 4,984,594. Although the heating blanket disclosed herein is sturdier than previous designs, it is still lightweight and flexible, capable of being rolled up and easily transported by commercial vehicle to another site. At the site it may be dragged over terrain into position. The heater assembly conforms to ground contours over long distances. It has good mechanical strength and high temperature corrosion resistance up to at least 1000° C. The heater achieves uniform areal temperatures as a result of its good two-dimensional thermal conductivity, which equalizes hot spots that might develop due to poor soil contact, surface irregularities, etc. The heater is also highly permeable to fluid flow and provides uniform air flow both horizontally and vertically. The heater is low cost and constructed from readily available commercial products. It is easily scaled up to very large areal dimensions. The heater also is easy to clean, free of moisture buildup, and has no tight places to trap even small amounts of contaminated soils. The heater has easily replaceable heating elements and may include redundant elements to allow continued operation if some elements fail during a remediation process. The heater has been found to be reliable in rugged terrain because the tensile stresses during dragging or rolling are not transmitted to the heating elements. Finally, the heater is intrinsically safer because the heating elements are completely sheathed with electrical insulation and current flow in the soil is eliminated.

SUMMARY OF THE INVENTION

The heating blanket assembly of this invention comprises three layers, the bottom layer being a furnace belt heater, the second layer being a flexible fibrous ceramic insulation, and the top layer being an impermeable silicone rubber sheet. The latter two layers may be essentially as conceived in U.S. Pat. No. 4,984,594.

The surface heater layer utilizes a commercial furnace belt such as that available from Maryland Wire Belts Inc. of Church Creek, Md. These metal furnace belts are normally used for conveying parts through high temperature furnaces and have good mechanical strength at high temperatures. They consist of interconnected spirals of metal strips (rungs) wrapped around adjacent pairs of metal support rods in a continuous roll process so that the entire belt can be rolled up either on a sprocket drive or on a smooth tube. The metal used for construction of the furnace belt is a high temperature metal alloy, for example T-314 or 310 stainless steel, which is usable to 1000° C. or above. The sets of rungs in the furnace belt can be spaced, for example, three-fourths inch apart.

The furnace belt has just enough space between the upper and lower rungs of adjacent support rods that a tubular "calrod" type heater can be inserted snugly through them. The tubular heaters can have tubular magnesium oxide insulated elements with a high temperature metal alloy such as Incoloy 800 or Inconel 601 outer sheath and a nichrome inner heater wire, such as those made by Chromalox Inc. The outer sheath on these calrod-type heaters can withstand prolonged operation at 1000° C. The heating elements may be inserted, for example, between every fourth set of rungs so they may be approximately 3 inches apart. The heat is distributed over this 3-inch distance between heating elements by the metal rungs and rods of the furnace belt. Additional replacement heating elements may be inserted through the unused sets of rungs and can be energized if an adjacent heating element fails during a remediation process.

These and other aspects of this invention are shown in more detail in the accompanying figures.

DETAILED DESCRIPTION OF THE DRAWINGS

Figure 1:
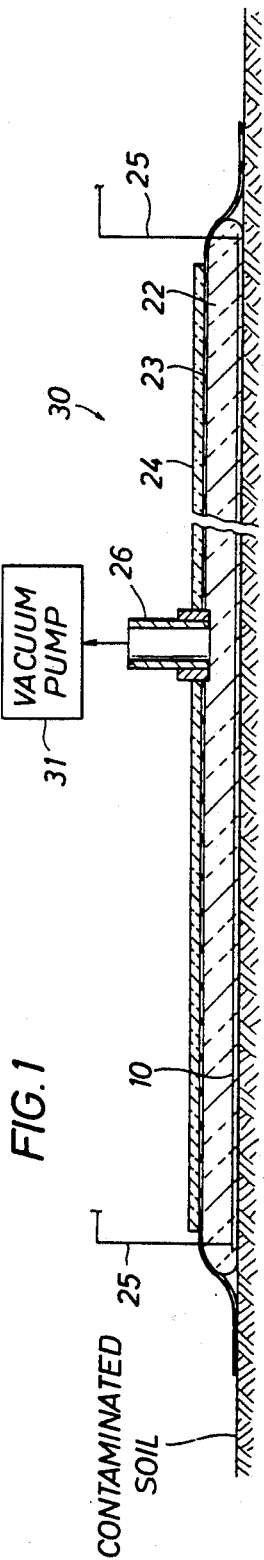
FIG. 1 is a schematic cross-section of the heating blanket assembly.

Referring now to FIG. 1, there is shown a schematic side view through a heating blanket assembly 30 section in a plane coincident with an opening in the impermeable sheet. The surface heater 10 is covered with a permeable mat 22, which is covered with an impermeable sheet 23. The surface heater 10 and permeable mat 22 are both permeable to gases. The impermeable sheet 23 is impermeable to gases. A layer of thermal insulation 24 may be included on top of the impermeable sheet 23. Power is supplied to the heaters of the heating blanket 10 by means of the leads 25. The opening 26 in the impermeable sheet 23 provides for connection to a vacuum pump 31.

Figure 2:
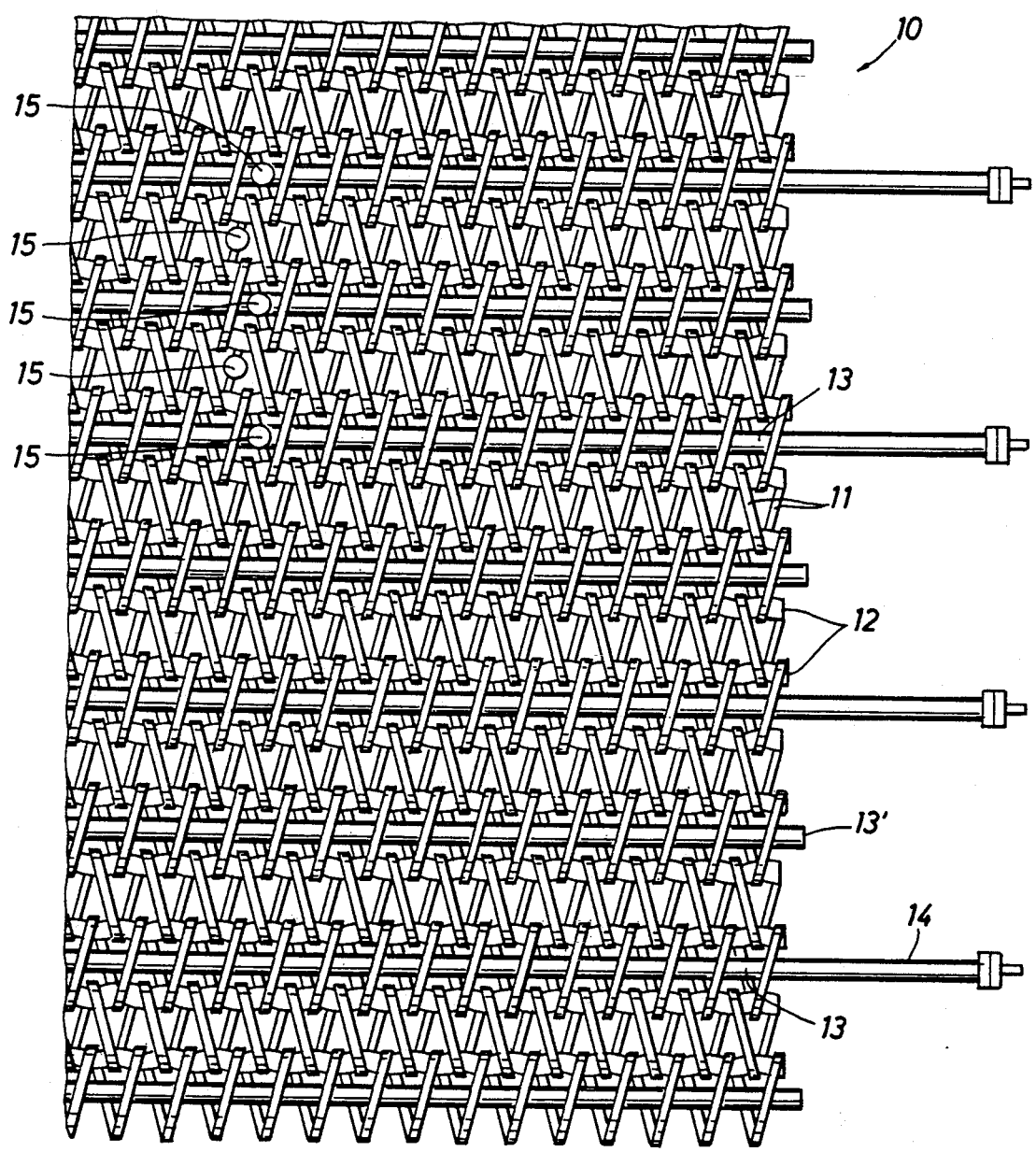
FIG. 2 shows a plan view of the metal furnace belt with calrod heaters inserted.

Referring now to FIG. 2, there is shown a plan view of the metal furnace belt heater 10 using a furnace belt such as that made by Maryland Wire Belts Inc. of Church Creek, Md. The metal furnace belt (without heaters) is constructed of a high temperature metal alloy such as stainless steel 310 or 314, both of which are usable to 1000° C., but could also be made of still higher temperature special alloys such as Incoloy 800HT, Inconel 601, Inconel 617, etc., which are usable to 1150° C. or hotter. In addition to being able to withstand high temperatures, the metal used in the furnace belt construction should also be a good thermal conductor for distributing heat throughout the furnace belt structure.

Furnace belts are normally used for conveying objects through a furnace, typically using a sprocket or chain drive. They are designed for high tensile loading even at elevated temperatures. This enables the furnace belt heater 10 of this invention to be moved while it is still hot, if desired, which can save time and electrical energy.

The furnace belt used in constructing the furnace belt heater 10 consists of rungs 11 which are metal strips spirally wrapped around support rods 12. The rods 12 are spiraled to accommodate the rungs 11. The spacing between rods 12 can be, for example, three-fourths inch, and there may be, for example, two rung wraps 11 per inch around the rods 12. A typical furnace belt used for the practice of this invention is the Maryland Wire Belts Inc. HD 1"×1" flat wire belt. The rods 12 are 6-gauge (0.203" dia.) wire and the flat metal strips used for the rungs 11 are $\frac{1}{8}$"×0.062". The approximate weight of the furnace belt is 3.649 lbs/sq ft. Although this size is used as an example, the rods and the metal stock used for the rungs 11 can be thicker or thinner than these dimensions.

The furnace belt is normally capable of being rolled up in a direction perpendicular to the direction of the rods 12 and is quite flexible in this direction. These are useful properties for this invention. The furnace belt can also be pushed together perpendicular to the axis of the rods 12, or may be expanded when pulled. This flexibility allows the furnace belt heater 10 to conform to changes in the ground surface over short distances.

The furnace belt has an open space between the upper and lower rungs into which calrod-type tubular heating elements 13 can be inserted to form the furnace belt heater 10, as shown in FIG. 2. The size of the rungs 11 and the heating elements 13 should be carefully chosen so that the heating elements 13 can be snuggly inserted. It may be necessary to apply some expansive force to the rungs 11 for the purpose of inserting the heating elements 13. However, once in place the heating elements 13 should be held tightly, but frictionally movable, by the furnace belt. The heating elements 13 will be slightly hotter than the furnace belt, and therefore, once energized, the relative thermal expansion of the heating elements 13 will make still better thermal contact with the rungs 11 of the furnace belt. This further improves the distribution of heat in the furnace belt structure. The heating elements 13 should be free to expand lengthwise as they heat up; otherwise, they will tend to bend and buckle.

The tubular calrod-type heating elements 13 can be, for example, type TRI 16 made by Chromalox Inc. These tubular heaters have an Incoloy 800 outer sheath, a compacted magnesium oxide inner insulation, and a nichrome wire inner heater. The outer diameter is 0.246", which enables the heating element 13 to be inserted between rungs of the furnace belt, in a direction parallel to the furnace belt support rods 12. As shown in FIG. 2, the heating elements 13 can be inserted between every fourth set of rungs 11, or about three inches apart. Additional heating elements 13' can be added for redundancy and can be placed, for example, between intermediate sets of rungs if desired. The extra heating elements 13' can be energized if one of the main heating elements 13 fails during a heating cycle, or if extra power is required.

This heater element 13 construction electrically insulates the inner nichrome wire from the furnace belt by means of the magnesium oxide insulation in the calrod-type heating element. This prevents electrical contact to the ground and improves the safety features of the heater 13.

The tubular calrod-type heaters 13 typically will have a cold pin section 14 near each end, which can be, for example, several inches long. The cold pin section 14 of the heaters 13 should extend outside the furnace belt. This enables the electrical connector which attaches to the heating elements 13 to stay cooler, as described hereinbelow with reference to FIG. 9.

The furnace belt heater 10 is also equipped with thermocouples 15 which are used for temperature measurement and control. These thermocouples 15 may be, for example, Type K (chromel-alumel) and are preferably of the sheathed ungrounded type. The thermocouple means 15 are either wired or welded onto the heater elements 13 or rungs 11 at locations typically shown in FIG. 2.

Figure 3:
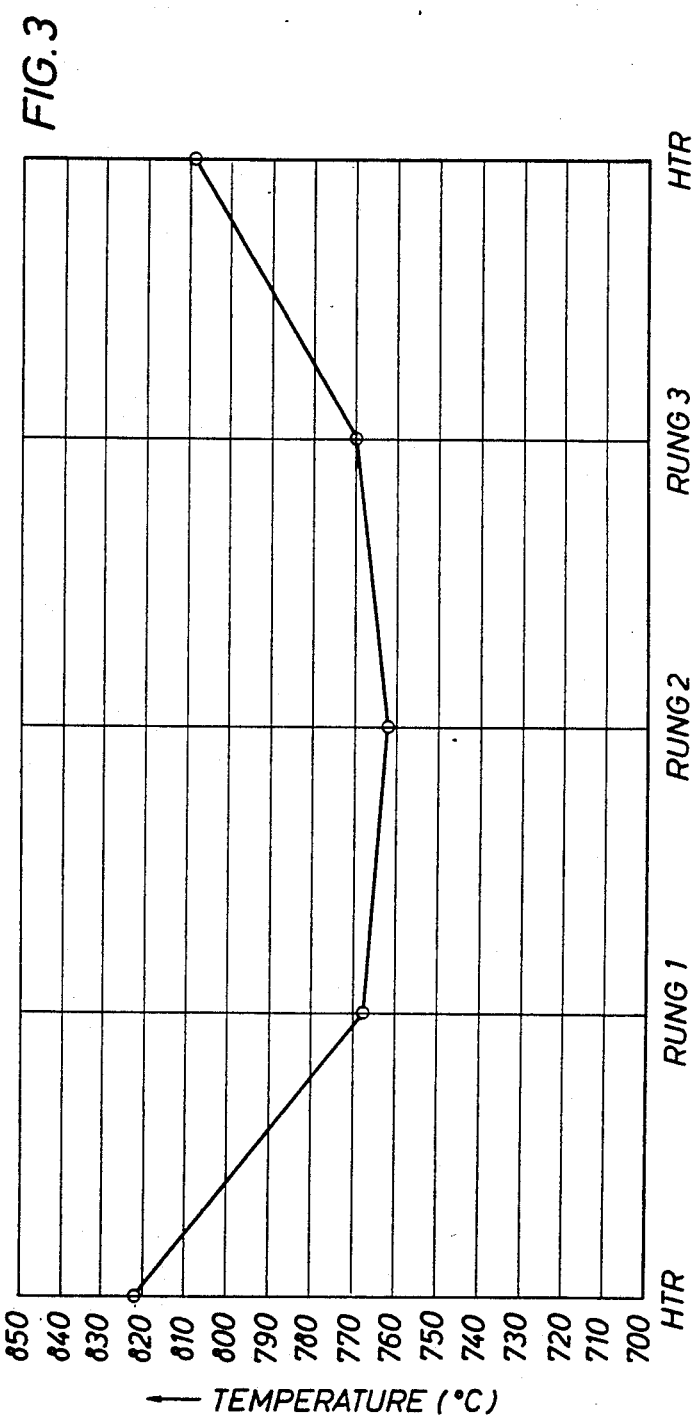
FIG. 3 shows the temperature profile between rungs of a furnace belt heater as described above with tubular heating elements spaced every three inches.

A major advantage of the furnace belt heater 10 design is that the two-dimensionally interlinked structure of the belt distributes heat uniformly away from the heating elements 13 and prevents local hot spots. These local hot spots are unavoidable in large scale field operations because of stones, dips, crevasses, etc. in the ground surface. FIG. 3 shows the temperature profile between rungs 11 of a furnace belt heater 10 as described above with tubular heater elements 13 spaced every three inches. The heating blanket assembly 30 was placed on a sandy soil and heated for several days with the heaters 13 at about 800° C. and a power density of 400 watts/ft$^2$. FIG. 3 shows actual field measurements of the temperatures at thermocouple 15 locations on the furnace belt rungs between two heaters as shown in FIG. 2. The temperatures droop only about 50° C. at the center rung because the two-dimensional thermal conductivity supplied by this furnace belt heater design spreads the heat uniformly away from the heater elements.

Figure 4:
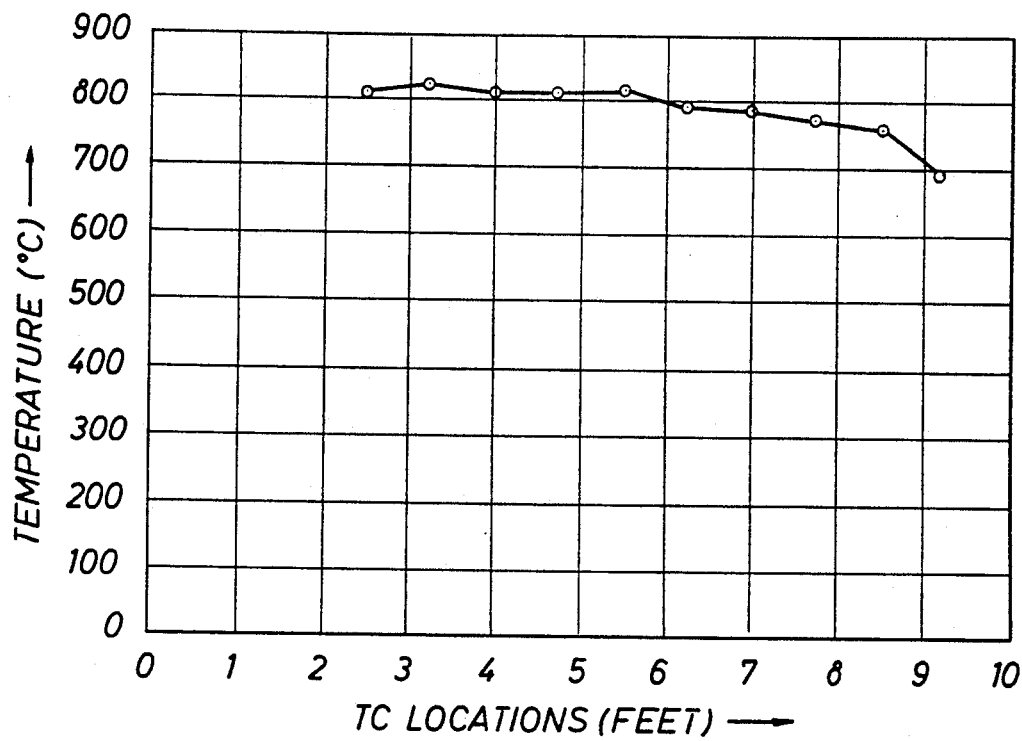
FIG. 4 shows the temperature profile of heater elements across a 10 ft × 10 ft heater after applying a power density of 450 watts/ft$^2$ for two days.

FIG. 4 shows the temperature profile across a 10 ft × 10 ft heater blanket 10 with a power density of 450 watts/ft$^2$. The profile is perpendicular to the calrod heaters at the mid-plane of the blanket. It is clear that, except at the edges, the furnace belt serves to smooth out any large scale hot spots so that the temperature is uniform to within about 50° C. across the entire blanket.

Another advantage of this invention is that, when the air is evacuated from under the blanket assembly 30 using a vacuum pump, atmospheric pressure presses the furnace belt heater 10 onto the ground with a high force per square inch. Thus the lower surfaces of the rungs 11 of the furnace belt tend to embed themselves into the soil. This establishes excellent thermal contact with the soil and improves heat transfer from the heaters 13 to the soil.

Still another advantage is that the furnace belt design provides very high air permeability through the structure, since it is mostly open to air flow. This results in only a low pressure drop in the radial direction away from the vacuum port 26 when the air is evacuated from under the impermeable sheet 23. Thus, contaminants are moved directly upwards out of the soil and have less tendency to migrate laterally. The high permeability allows one to establish a uniform vacuum over very large areas which is essential for large scale applications of this invention.

The open structure of the furnace belt also allows the furnace belt to be easily cleaned of soil that may adhere after use. Cleaning can be done using a high pressure water hose, for example.

Figure 5:
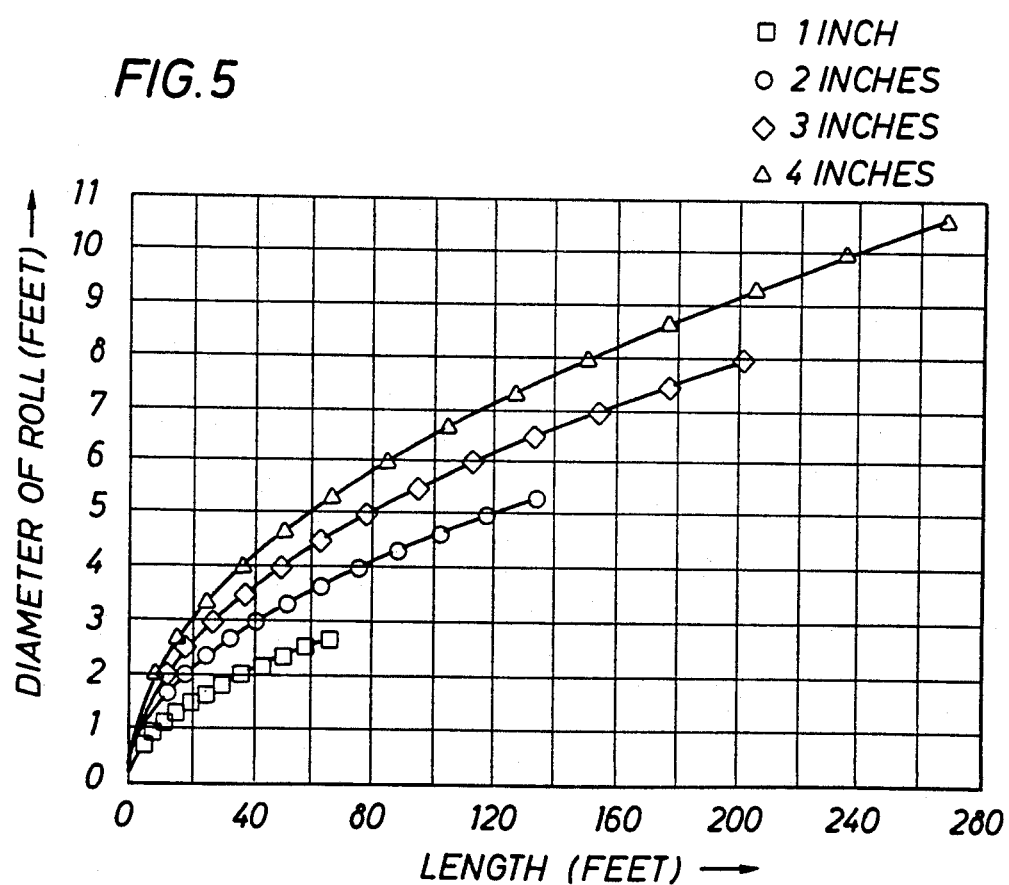
FIG. 5 shows the diameter of a rolled up blanket as a function of the thickness of the blanket material.
Figure 6:
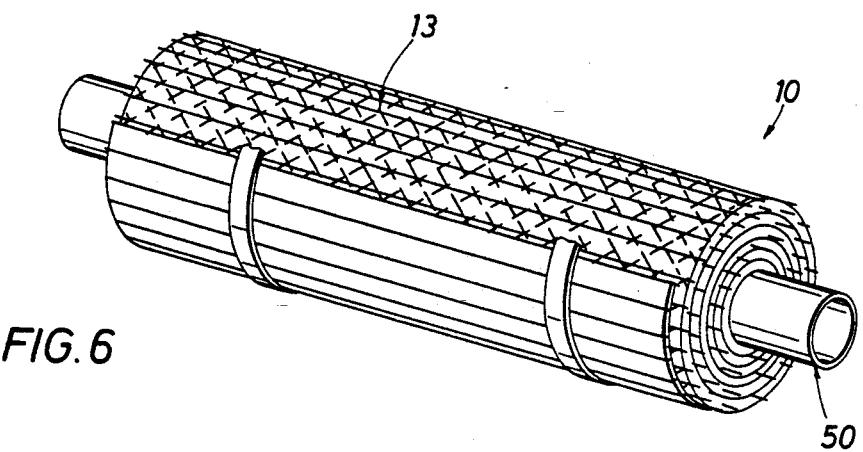
FIG. 6 shows how the furnace belt can be rolled up on a sturdy metal tube for easier transportation.

Yet another advantage of this invention is that the furnace belt assembly 30 can be rolled up into a tight roll for easier transportation to the site. FIG. 5 shows the diameter of the roll as a function of the thickness of the blanket. Thus, for example, a 4-inch thick blanket assembly 30 consisting of furnace belt heater 10, fibrous ceramic insulation 22, and silicone rubber sheet 23 about 250 feet long will have a diameter of approximately 10-feet when rolled up. This can be easily transported on a flatbed truck. FIG. 6 shows how the furnace belt can be rolled up on a sturdy metal tube 50 for easier transportation.

Figure 7:
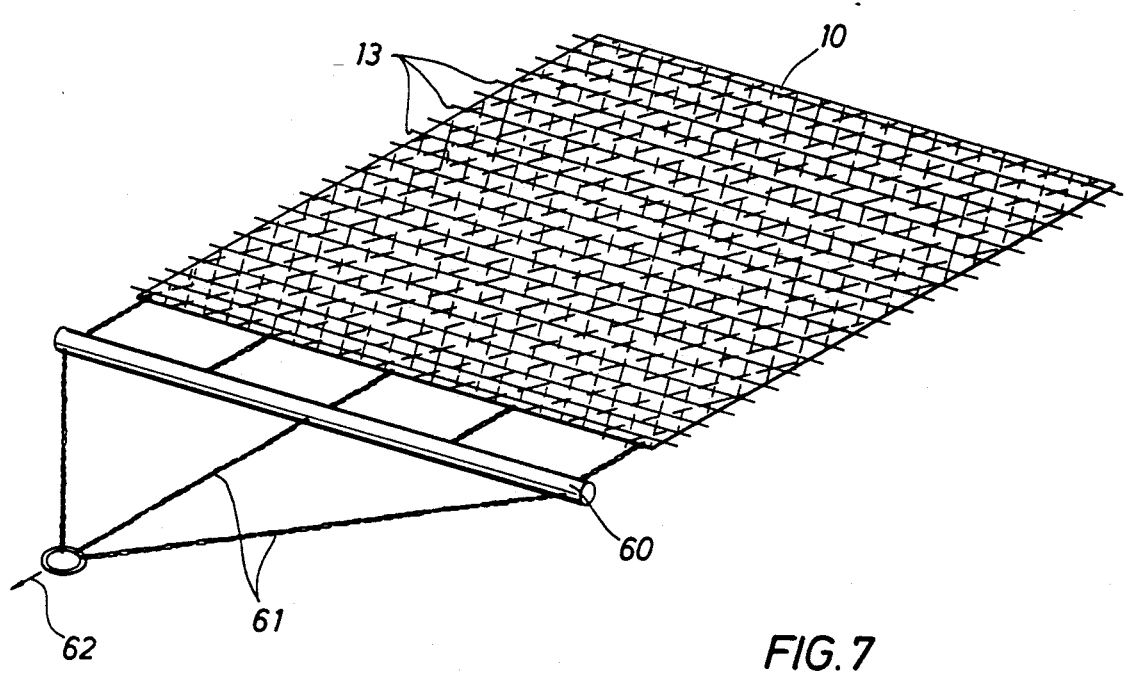
FIG. 7 shows a means for dragging the furnace belt.

Upon arrival at a site, the sturdy furnace belt can be unrolled and dragged into position, using, for example, a tractor. A possible harness arrangement for dragging the furnace belt is shown in FIG. 7. A conveyance means 62 is connected by chains 61 to a pull bar 60, and hooked onto the rungs 11 of the furnace belt 10. Although transportation would normally be done with the heaters 13 cold, the high tensile strength of the furnace belt 10 at high temperatures enables one to move the blanket assembly 30 with the furnace belt still hot. Because the furnace belt supports the tensile loads when the assembly 30 is dragged, rather than the calrod-type heating elements 13, which are merely inserted between the rungs, the blanket assembly 30 can be dragged without damage or strain to the heating elements 13. This is a major advantage relative to U.S. Pat. No. 4,984,594.

Figure 8:
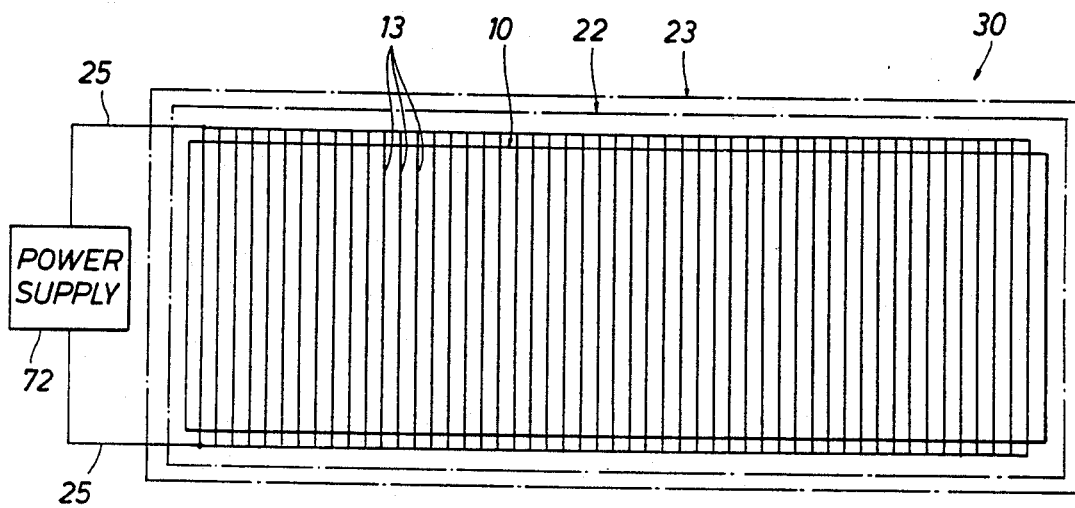
FIG. 8 shows a full scale implementation of the heater blanket.

FIG. 8 shows a particular full-scale implementation of the heater blanket assembly 30. The blanket 30 is 40 ft by 250 ft, which can treat 10,000 square feet of contaminated soil at one time. The power bus connections 25 are made along the two long edges.

Figure 9:
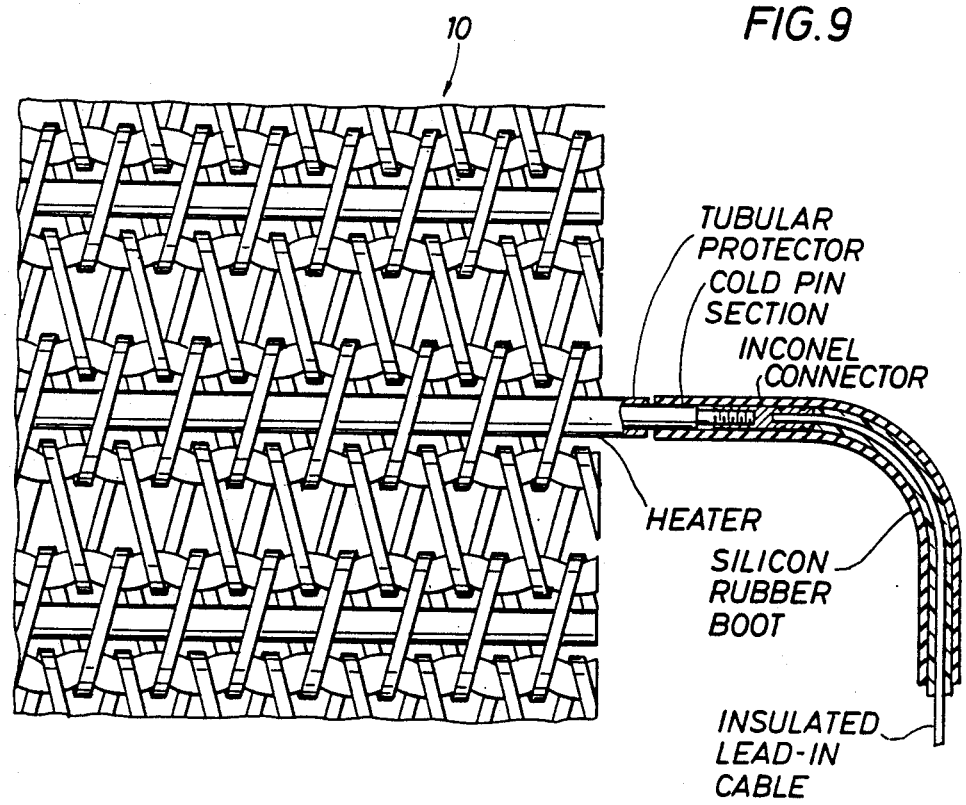
FIG. 9 shows a more detailed view of the heater element connection.

FIG. 9 shows a more detailed view of the heater element 13 connections to the power cables. Connections should be made in the cold-pin section 14 of the tubular heaters 13 (and 13' if desired), at least several inches away from the furnace belt. The connections are preferably of the silicone rubber-insulated quick-connect type so that many connections can be made and unmade easily. Alternatively, the cold pin section 14 can be made longer than a few inches. The connections may also consist of a jumper section a few feet long with ceramic insulated beads over bare metal wire, although this does not guarantee electrical insulation because of the use of bare metal wire.

Referring back to FIG. 8, the power bus 25 connects to a power supply means 72, which can be, for example, one or several 3-phase power supplies. For the above mentioned 10,000 ft$^2$ heater blanket, approximately 4 megawatts of total power will be required for 400 watts/ft$^2$ power density. The 4 megawatts can be supplied by a large diesel generator, or an AC power line can be brought to the site through a transformer. The power supplies 72 are capable of delivering electrical power to the heaters in a programmed mode by controlling the temperatures recorded by the thermocouples placed on the heater blanket.

Figure 10:
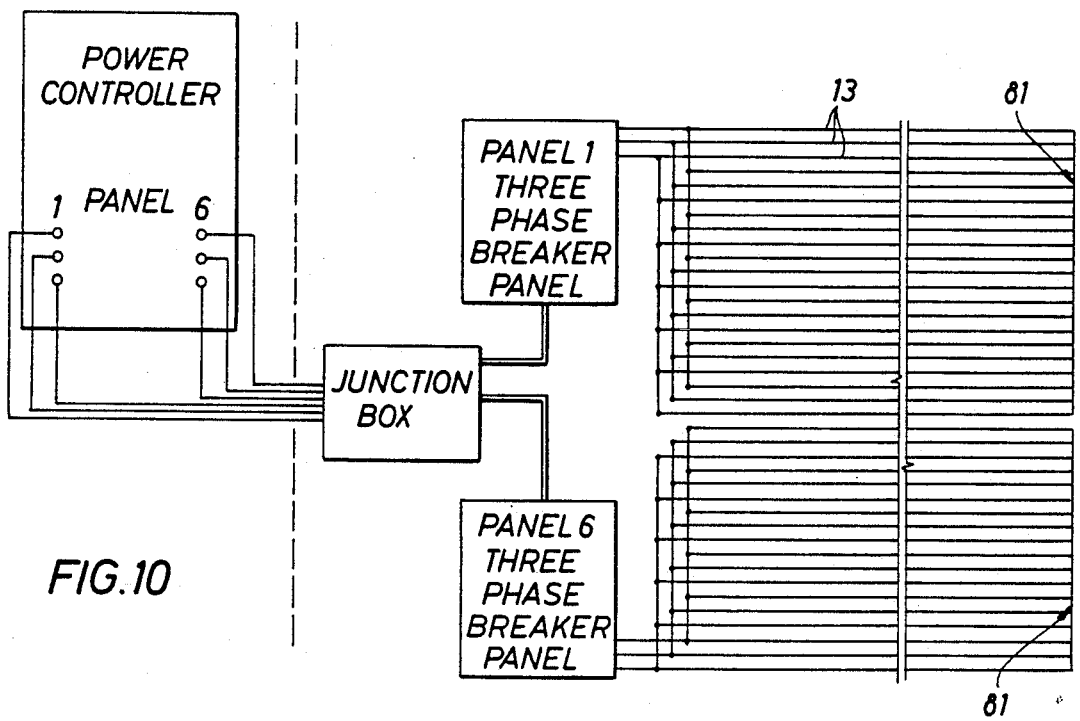
FIG. 10 shows the electrical connection for three-phase AC operation.

The furnace belt heater 10 is preferably energized by multiple three-phase AC power sources, as shown in FIG. 10. In this case several heater elements 13 are connected in parallel with a common Y configuration. A, B, and C denote the three phases of the AC power on the left. On the right is the common ground bus 81. The correct number of heaters 13 are connected in parallel to achieve the desired load for each of the three phases of the power supply. FIGS. 11a–11d show alternative methods of connecting the tubular heaters 13 in parallel and/or in series of parallel groups to obtain the desired electrical load for single phase power. The object of these configurations of heating elements in the furnace belt is (1) to minimize the number of connections to the power supply and (2) to maximize as much as possible the distance on the ground between points in the circuit having high electrical potential differences. The heating elements 13' may also be wired so that electrical power can be applied if needed.

As described in U.S. Pat. No. 4,984,594, the insulating layer 22 may consist of several inches of refractory ceramic fiber. This insulating stuffing can be quilted into a blanket using a ceramic cloth (alumina-silica, alumina, alumina-boria-silica, etc.) for top and bottom layers. For example, NEXTEL cloth from 3M Co. and NEXTEL quilting yarn can be used. Quilting is important to prevent the stuffing from shifting around during use.

Also as described in U.S. Pat. No. 4,984,594, the vacuum seal layer consists of a silicone rubber sheet 23, such as ⅛" thick material, although it could be thicker or thinner than this. The silicone rubber sheet can be reinforced with fiberglass for extra strength. A hole can be cut in the top of the silicone rubber sheet 23 to connect the vacuum line port 26.

Figure 12:
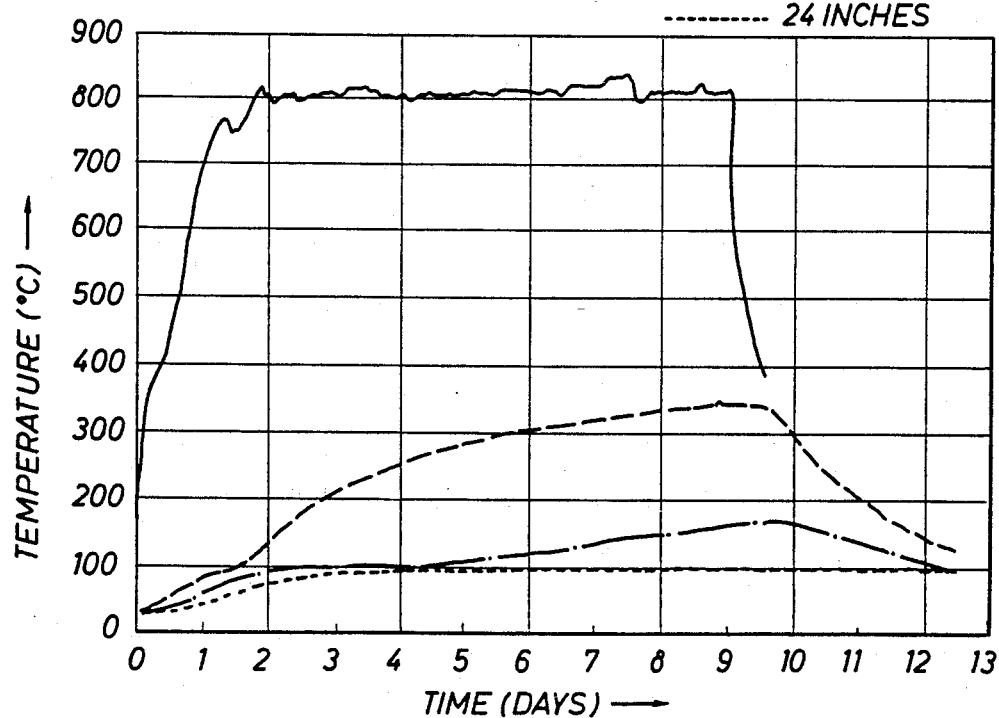
FIG. 12 shows the temperatures within the soil at different depths as a function of heating time using the furnace belt heater disclosed herein.
Figure 11A:
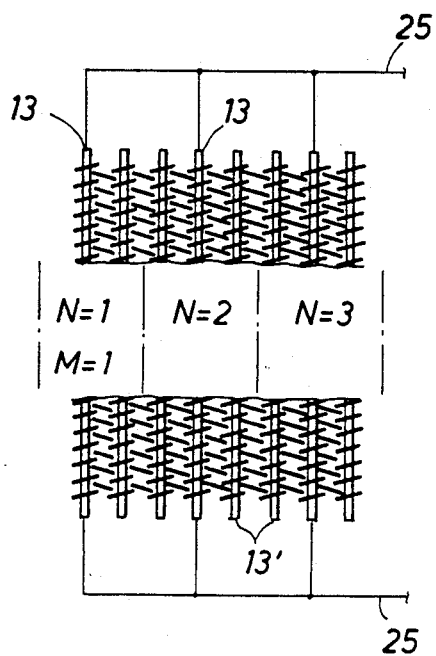
FIG. 11 shows some alternative arrangements of the furnace belt heater elements that obtains the desired electrical load in single-phase operation.
Figure 11B:
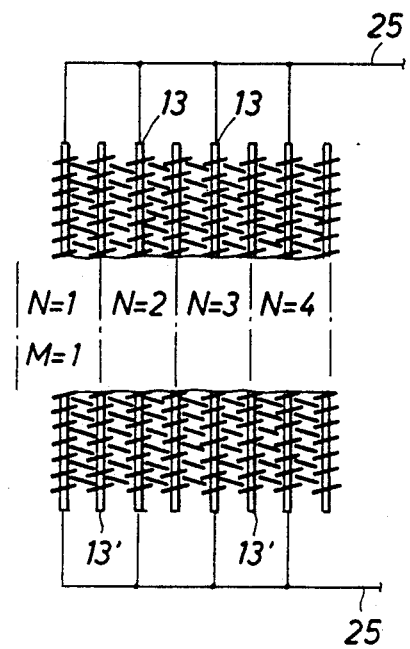
Figure 11C:
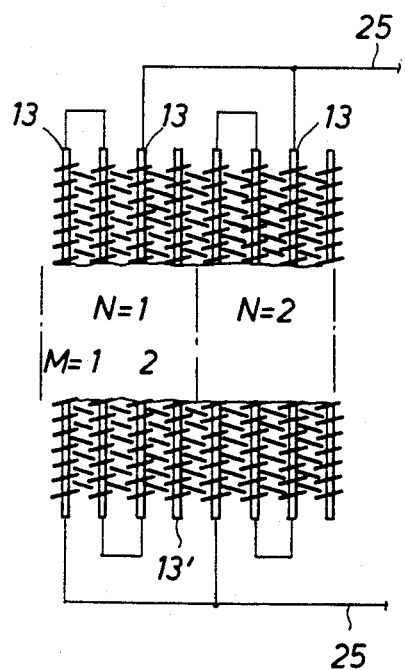
Figure 11D:
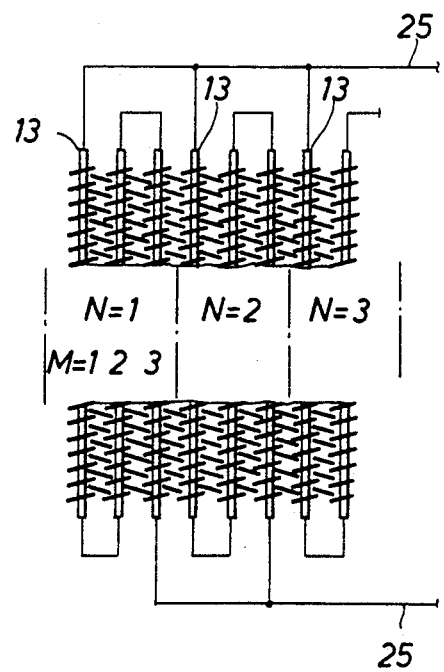

FIG. 12 shows the temperatures within the soil at different depths as a function of heating time, using the furnace belt heater assembly 30 disclosed herein. The furnace belt heater 10 was heated to about 800° C. within the first two days and maintained at that temperature while the heat front propagated into the soil. Note the inflection in the temperature vs. depth curves as the soil temperature reaches 100° C. at successively greater depths. This is due to boiling off the free water in the soil.

Other modifications of this basic invention will be obvious to those skilled in the art. These modifications are also construed to be within the scope of this invention.

What is claimed is:

1. A heater for use in soil remediation comprising:
   a plurality of metallic support rods spaced apart and parallel to each other;
   a continuous metallic strand spirally encircling adjacent ones of said support rods and forming rungs therearound, said rungs extending the length of said support rods, making low resistance contact therewith but being frictionally movable with respect thereto; and
   an electric heater element located between and parallel to a selected pair of said support rods and between said rungs encircling said selected pair of support rods, said heater being in low resistance frictional contact with said rungs along its length.

2. The heater of claim 1 wherein said electric heater element is a calrod-type tubular heating element.

3. The heater of claim 1 further comprising a layer of insulation on top of said heater.

4. The apparatus of claim 3 wherein said insulation is fibrous ceramic.

5. The heater of claim 3 further comprising an impermeable sheet placed on top of said insulation.

6. The heater of claim 4 further comprising an impermeable sheet placed on top of said fibrous ceramic insulation.

7. The heater of claim 5 wherein said impermeable sheet has a hole therein for connection to a vacuum pump.

8. The heater of claim 6 wherein said impermeable sheet has a hole therein for connection to a vacuum pump.

9. A heater assembly for use in soil remediation comprising:
   a plurality of metallic support rods spaced parallel to each other;
   a continuous metallic strand spirally encircling adjacent ones of said support rods and forming rungs therearound, said rungs extending the length of said support rods, making low resistance contact therewith but being frictionally movable with respect thereto;
   an electric heater element located between and parallel to a selected pair of said support rods and between said rungs encircling said selected support rods, said heater being in low resistance frictional contact with said rungs along its length;
   a layer of insulation on top of said assembly; and
   an impermeable sheet placed on top of said insulation.

10. The electric heater assembly of claim 9 wherein said heater element is a calrod-type tubular heating element.

11. The apparatus of claim 9 wherein said insulation is fibrous ceramic.

12. The heater assembly of claim 9 wherein said impermeable sheet has a hole therein for connection to a vacuum pump.

* * * * *